United States Patent
Roman

[11] Patent Number: 6,007,766
[45] Date of Patent: Dec. 28, 1999

[54] CUTTING INSERT ADAPTED TO BE GROUND ON UPPER AND LOWER SURFACES THEREOF

[75] Inventor: Stefan Roman, Sandviken, Sweden

[73] Assignee: Sandvik AB, Sandviken, Sweden

[21] Appl. No.: 09/152,066

[22] Filed: Sep. 11, 1998

Related U.S. Application Data

[62] Division of application No. 08/798,152, Feb. 10, 1997, abandoned.

[51] Int. Cl.⁶ ........................................................ B22F 3/24
[52] U.S. Cl. .............................. 419/17; 419/26; 407/113; 407/114; 407/115; 407/116; 51/307
[58] Field of Search ........................ 419/17, 26; 407/114, 407/116, 113, 115; 51/307

[56] References Cited

U.S. PATENT DOCUMENTS

| | | |
|---|---|---|
| 3,341,920 | 9/1967 | Kelm . |
| 3,341,921 | 9/1967 | Weller et al. . |
| 3,383,748 | 5/1968 | Galimberti et al. . |
| 4,116,576 | 9/1978 | Gawryk, Sr. . |
| 5,078,550 | 1/1992 | Satran et al. . |
| 5,365,805 | 11/1994 | Pantzar et al. .......................... 76/101.1 |
| 5,477,754 | 12/1995 | Herbon ................................... 76/101.1 |
| 5,569,000 | 10/1996 | Littecke et al. .......................... 407/114 |

*Primary Examiner*—Ngoclan Mai
*Attorney, Agent, or Firm*—Burns, Doane, Swecker & Mathis, L.L.P.

[57] ABSTRACT

An indexable cutting insert for metal machining comprises an upper rake surface, a bottom surface and side surfaces that extend between the upper and bottom surfaces. Cutting edges are formed at the transitions between the side surfaces and the upper surface. Disposed along the cutting edges on the upper surface are elongated primary lands. Disposed inside of the lands is a chip-breaking depression. A raised land area to be ground is situated in the chip-breaker, so that the total grinding area of the upper surface becomes about as large as the total grinding area of the bottom surface. The insert can thus be ground by upper and lower grinding wheels which rotate simultaneously in opposite directions.

4 Claims, 2 Drawing Sheets

CUTTING INSERT ADAPTED TO BE GROUND ON UPPER AND LOWER SURFACES THEREOF

This application is a divisional of application Ser. No. 08/798,152, filed Feb. 10, 1997 now abandoned.

BACKGROUND OF THE INVENTION

The present invention relates to a cutting insert which is ground to form a sharp edge. The cutting insert is primarily intended for milling, although also cutting inserts for turning and drilling lie within the framework of the invention.

Cutting inserts such as indexable inserts are made by form-pressing and sintering of a cutting material-forming powder, usually cemented carbide. The cutting insert comprises (a) an upper surface or chip surface, (b) a bottom surface substantially parallel with the upper surface (these two surfaces constitute the main surfaces) and abuttable against a cooperating bottom support surface in an insert seat, and (c) side or relief surfaces extending between these upper and bottom surfaces. At least one of the side or relief surfaces is abuttable against a cooperating side support surface in the insert seat. The side surfaces may be perpendicular to said upper and bottom surfaces, but usually they are somewhat obliquely positioned, i.e., oriented at an acute angle to the upper surface, and at an obtuse angle to the bottom surface. A transition between the upper surface and a side surface is shaped as a cutting edge.

In production of primarily indexable cutting inserts of cemented carbide, a direct pressing method is being employed to an increasing extent, according to which method a cemented carbide forming powder first is shaped into the desired form in a pressing tool, and thereafter it is given the final strength by being sintered in an oven. The pressing operation as such has been refined and is today so rational that it brings about good possibilities of forming the cutting edge and the appurtenant chip shaping surfaces and possible reinforcing faces with great accuracy.

For some types of machining, e.g., some forms of face milling and corner milling, the requirements of shape and dimensional accuracy of the inserts have been raised during the last years. Primarily geometries with sintered-in positive cutting edges require a very high dimensional accuracy in order to guarantee a satisfactory result at small tooth feeds. These requirements of dimensional accuracy, and in some cases also on sharp cutting edges, have hitherto been achieved by so-called contour grinding or peripheral grinding, wherein the surface(s) that adjoins the individual cutting edge is after-ground following the usual grinding and cooling. This contour grinding is made on the relief side of the cutting insert, i.e., on the side surfaces. As an example of such a grinding, U.S. Pat. No. 5,078,550 is referred to. However, thereby the working measure or the IC measure are altered. Further, when the cutting insert has sintered-in chip breakers, the after-grinding may result in the primary land of the cutting insert becoming unacceptably narrow and fragile. Moreover, the bottom surface of the cutting inserts have been ground a substantially perfect plane, in order to guarantee a safe and stable support in the insert seat.

However, in order to not excessively alter the working measure of the cutting insert and at the same time obtain a sharp cutting edge, it would be desirable to be able to grind the cutting edge with the appurtenant primary land from above, i.e., on the upper or chip surface of the cutting insert. However, in conventional grinding machines this has not been feasible due to the fact that very little material of the upper surface is to be ground, i.e., only the cutting edge line or a primary land immediately adjacent the cutting edge line. Because of the small extent or area of the cutting edge line or primary land (often <0.2 mm), the speed of the grinding plate has to be lowered and then undesired chippings are obtained. Furthermore, it is extremely difficult to control the grinding capacity when there is not enough material that exerts a resistance against the grinding operation, whereby the precision of the ground face becomes poor.

Thus, a primary object of the present invention is to provide a cutting insert that may be ground with a substantially unaltered chip cutting geometry on the rake side as well as on the relief side by a conventional grinding mechanism.

A second object of the invention is to be capable of producing sharp cutting edges without altering the chip cutting geometry.

Still another object of the present invention is to rationalize the grinding of the cutting inserts as much as possible.

SUMMARY OF THE INVENTION

These and further objects have been achieved in a cutting insert of the type having a chip-breaking depression formed in an upper surface thereof, with primary lands deposed between the depression and cutting edges of the insert. Situated within the chip-breaking depression is at least one raised inner land area. That inner land area is located in the same plane as the primary land and is adapted to be submitted to a common planar grinding therewith. The total area to be ground on the upper side is of about the same order of magnitude as the total area to be ground on the bottom side of the cutting insert. Preferably, the total area to be ground on the upper side is between 80 and 120% of the total area to be ground on the bottom side.

BRIEF DESCRIPTION OF THE DRAWING

For illustrative but non limiting purposes, a preferred embodiment of the invention will now be described in more detail with reference to the appended drawings. These are herewith briefly presented.

DETAILED DESCRIPTION OF A PREFERRED EMBODIMENT OF THE INVENTION

Figure 1:
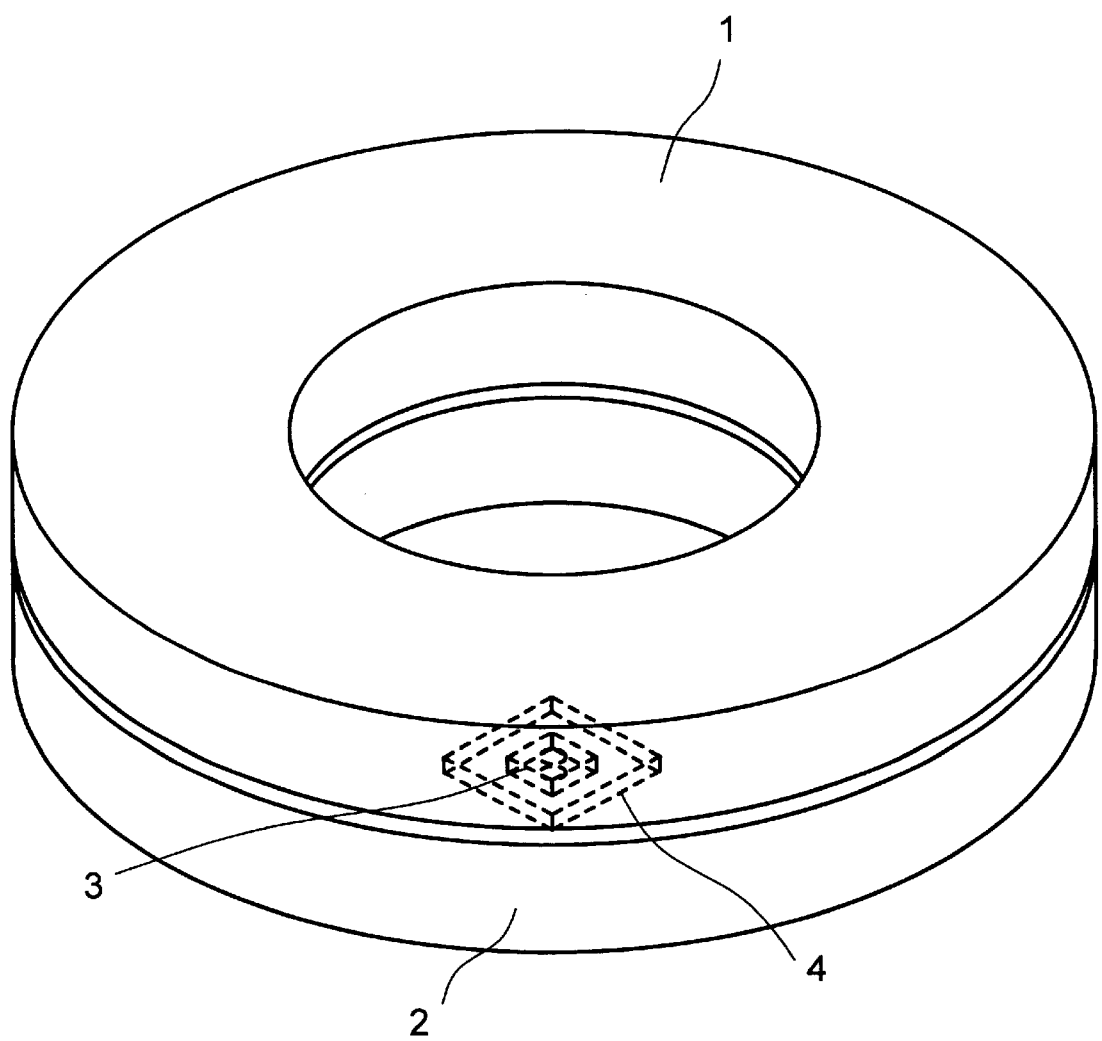
FIG. 1 shows a perspective view of a conventional grinding machine which is used in connection with inserts constructed according to the invention.

FIG. 1 shows in a stylized form two individually rotatable grinding plates 1 and 2 of conventional type, which are used for the grinding of inter alia cutting inserts, such as indexable cutting inserts 3 of a square basic shape. In order to be able to grind such hard materials as cemented carbide, the upper plate 1 and the lower plate 2, respectively, are coated with a diamond powder. A cutting insert, whose upper and/or bottom surfaces are to be ground, is held steadily between the grinding plates by means of a perforated insert holder or tray, whose thickness is less than the thickness of the cutting inserts. A part of this tray is illustrated by means of the cut-out detail 4. When grinding cutting inserts having sintered chip breakers and narrow primary lands, it has heretofore only been possible to grind the bottom surface of the cutting insert. Thereby, the upper plate 1 would be kept still, which in practice then only functions as a support in order to permit the necessary pressure between the bottom surface of the cutting insert and the lower grinding plate 2. When grinding cutting inserts with a wholly planar upper surface, however, both plates could be rotated simultaneously, whereby the opposed upper and bottom surfaces are ground simultaneously, which constitutes the optimal and most favorable grinding manner, from a production-technical point of view. In order to counteract the grinding forces and minimize the withholding forces upon the tray 4, the two plates would be rotated in opposite directions. If the ground surface is larger on the one side, the grinding plate on that side may be rotated correspondingly faster. Thus, by adjusting the rotating speed of the plates one may obtain the effect that about the same grinding play is removed on the two ground surfaces. However, if the difference between the sizes of the ground surfaces is too large, which thus is the case when only a narrow cutting edge line constitutes the whole grinding surface on the upper side of the cutting insert, such an adjustment of the interrelated rotation speeds is not possible any more. Specifically, that problem has been solved by the present invention.

Figure 2:
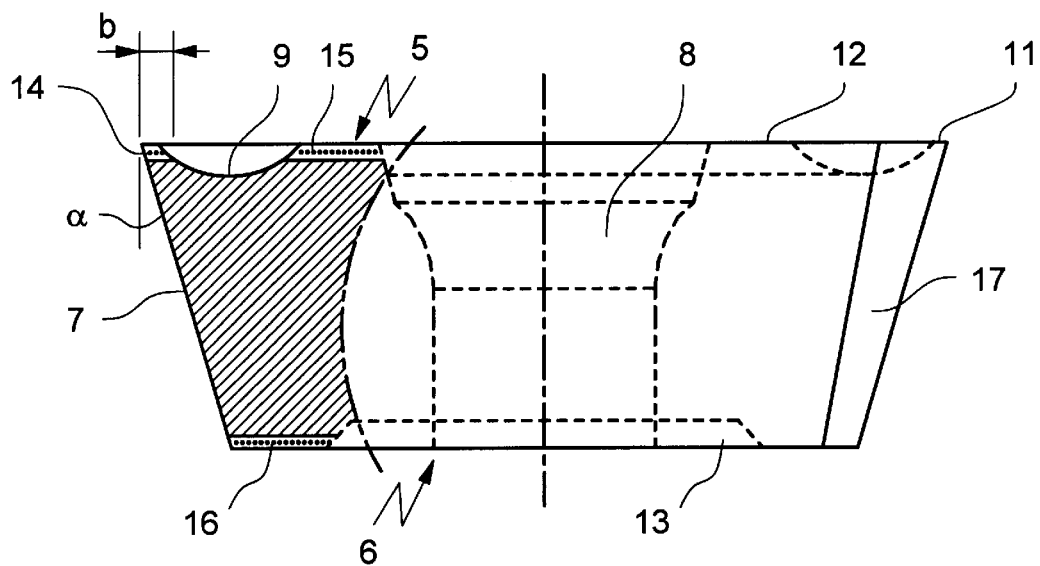
FIG. 2 shows an indexable cutting insert according to the invention which is partly shown in a cross-section that coincides with a vertical plane II—II (see FIG. 3) through the center axis of the cutting insert.
Figure 3:
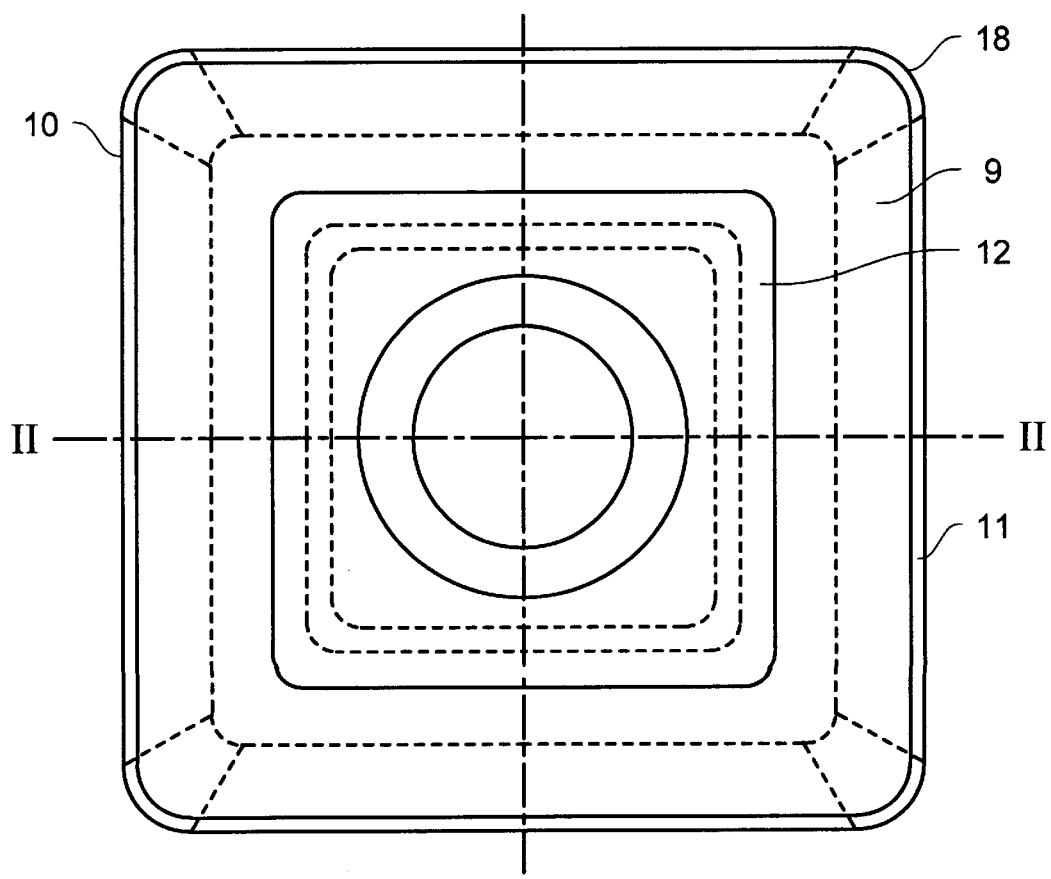
FIG. 3 shows a top view of an indexable cutting insert according to the invention.

FIGS. 2 and 3 illustrate a square positive cutting insert according to the present invention. It has an upper surface 5, a bottom surface 6 and four side surfaces 7. The transitions between the four side surfaces 7 may be sharp but consist preferably of rounded corner portions 17. The relief angle α, i.e., the angle between a side surface 7 and a line extending to the upper and lower surfaces, may be between 0 and +40°, preferably between +5 and +30°. Further, the insert may have a center through-hole 8 for the insertion of a suitable clamping device, such as lock screw (not shown). However, a center hole as such is not necessary, in view of the fact that the cutting insert may also be fastened by other means, such as for instance by means of a clamp or a wedge.

In accordance with modern geometries of indexable cutting inserts, the upper surface of the cutting insert has a sintered-in chip breaker 9, which results in a more positive and a more light-cutting geometry. This chip breaker may for instance be made in the form of an uninterrupted, circumferential depression, such as shown in FIG. 3. Adjacent to the main cutting edge 10 is the primary land 11, whose width b is less than 1 mm, suitably 0.5 mm, and most preferably 0.2 mm. Between two adjacent main cutting edges 10 is a rounded corner cutting edge 18. Within the chip breaker depression 9 is a raised land area 12 which surrounds the center hole 8. Since the cutting insert is square, the land area 12 is suitably also square, although it would also be capable of having another geometrical shape, such as a regular octagon or a rounded surface.

Around the center hole 8, the bottom surface 6 may have a depression or recess 13, whose object is, on one hand, to decrease necessary grinding and, on the other hand, to provide room for receiving impurity particles possibly originating from the hole and from the screw. According to the present invention, if the cutting insert does not have such a recess, the grinding area on the upper surface of the cutting insert shall be increased to the corresponding extent, as explained below.

Both the upper and bottom surface have a grinding play (i.e., material to be removed), which in FIG. 2 is illustrated by dotted lines. On the upper surface, the primary land 11 has a grinding play 14 and the land area 12 has a grinding play 15. The primary land 11, the land area 12, and the grinding play 14 and 15, respectively, are located in the same plane. On the bottom surface 6 there is a grinding play 16. A substantial feature of the present invention is that the total surface area to be ground on the upper side is of about the same order of magnitude as the total surface area to be ground on the bottom side. By the expression "about the same order of magnitude" is meant that the total area to be ground on one of the main surfaces 5, 6 amounts to between 80 and 120% of the total area to be ground on the other main surface, most preferably between 85 and 115%. In this way, a balanced grinding is achieved on the upper and bottom surfaces, since the total grinding work becomes about the same on the two sides. Thus, the two grinding plates 1 and 2 may be rotated with about the same speed (and in opposite directions), in order to grind away equal amounts of material from the upper and bottom surfaces. Due to this balancing, it has also been achieved that the narrow primary land 11 may be ground with great precision, which has hitherto been impossible. The production cost is considerable reduced by the fact that by this simultaneous top and bottom grinding one obtains a fast, effective and very accurate grinding. Moreover, the same cutting edge sharpness is obtained as by conventional grinding.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A method of manufacturing a cutting insert for chip-breaking metal machining, the method comprising the steps of:

A) sintering carbide powder to form a pre-ground insert which comprises an upper rake surface, a bottom support surface and side surfaces interconnecting the rake surface and the bottom surface, the side surfaces intersecting the rake surface at an acute angle to form main cutting edges therewith, the rake surface including a chip-breaking depression, primary lands disposed between the depression and the main cutting edges, and at least one inner land disposed inwardly of the depression, wherein the primary lands and the at least one inner land together define a first surface area lying in a first plane, the support surface defining a second surface area lying in a second plane disposed parallel to the first plane, the first surface area being between 80 and 120 percent of the second surface area;

B) positioning the pre-ground insert between a pair of grinding plates, such that the grinding plates contact the first and second surface areas, respectively; and C) rotating the grinding plates simultaneously in opposite directions about a common axis for grinding the first and second surface areas.

2. The method according to claim 1, wherein step A comprises sintering carbide powder to form a pre-ground insert whose primary land has a width less than 1.0 mm.

3. The method according to claim 1 wherein step A comprises sintering a carbide powder to form a pre-ground insert wherein the depression completely surrounds the at least one inner land.

4. The method according to claim 1 wherein step A comprises sintering a carbide powder to form a pre-ground insert whose first surface area is between 85 and 115 percent of the second surface area.

* * * * *